(12) United States Patent
Zeiler (10) Patent No.: US 10,296,826 B1
(45) Date of Patent: May 21, 2019

(54) SYSTEMS AND METHODS FOR LEARNING NEW TRAINED CONCEPTS USED TO RETRIEVE CONTENT RELEVANT TO THE CONCEPTS LEARNED

(71) Applicant: CLARIFAI, INC., New York, NY (US)

(72) Inventor: Matthew D. Zeiler, New York, NY (US)

(73) Assignee: CLARIFAI, INC., New York, NY (US)

(*) Notice: Subject to any disclaimer, the term of this patent is extended or adjusted under 35 U.S.C. 154(b) by 849 days.

(21) Appl. No.: 14/820,448

(22) Filed: Aug. 6, 2015

(51) Int. Cl.
*G06N 3/08* (2006.01)
*G06F 17/30* (2006.01)
*G06F 16/28* (2019.01)
*G06F 16/2457* (2019.01)

(52) U.S. Cl.
CPC ......... *G06N 3/08* (2013.01); *G06F 16/24575* (2019.01); *G06F 16/285* (2019.01); *G06F 17/30528* (2013.01); *G06F 17/30598* (2013.01)

(58) Field of Classification Search
CPC ....................................... G06F 16/242–16/2448
See application file for complete search history.

(56) References Cited

U.S. PATENT DOCUMENTS

| | | | | |
|---|---|---|---|---|
| 9,639,532 B2* | 5/2017 | Raichelgauz | .......... | H04H 60/37 |
| 2012/0209795 A1* | 8/2012 | Glickman | .......... | G06Q 30/0201 |
| | | | | 706/12 |
| 2017/0277693 A1* | 9/2017 | Mehedy | .............. | G06F 17/3053 |
| 2018/0060701 A1* | 3/2018 | Krishnamurthy | .... | G06K 9/6269 |
| 2018/0240013 A1* | 8/2018 | Strope | ...................... | G06N 3/08 |
| 2018/0246966 A1* | 8/2018 | Liu | ................... | G06F 17/30864 |
| 2018/0293313 A1* | 10/2018 | Hauptmann | ...... | G06F 17/30837 |

OTHER PUBLICATIONS

Alzu'bi, Ahmad et al.; "Semantic content-based image retrieval: A comprehensive study"; 2015; ELSEVIER; J. Vis. Commun. Image R. 32 (2015) 20-54. (Year: 2015).*
Liu, Jingen et al.; "Video Event Recognition Using Concept Attributes"; 2013; pp. 339-346. (Year: 2013).*

(Continued)

*Primary Examiner* — Stanley K. Hill
(74) *Attorney, Agent, or Firm* — Pillsbury Winthrop Shaw Pittman LLP (57) ABSTRACT

A system configured for learning new trained concepts used to retrieve content relevant to the concepts learned. The system may comprise one or more hardware processors configured by machine-readable instructions to obtain one or more digital media items. The one or more hardware processors may be further configured to obtain an indication conveying a concept to be learned from the one or more digital media items. The one or more hardware processors may be further configured to receive feedback associated with individual ones of the one or more digital media items. The one or more hardware processors may be configured to obtain individual neural network representations for the individual ones of the one or more digital media items. The one or more hardware processors may be configured to determine a trained concept based on the feedback and the neural network representations of the one or more digital media items.

20 Claims, 5 Drawing Sheets

(56) References Cited

OTHER PUBLICATIONS

Ulges, Adrian et al.; "Learning automatic concept detectors from online video"; ELSEVIER; Computer Vision and Image Understanding 114 (2010) 429-438. (Year: 2010).*
Liu, Ying et al.; "A Survey of content-based image retrieval with high-level semantics"; 2006; ELSEVIER; Patter Recognition 40 (2007) 262-282. (Year: 2007).*
Haav, Hele-Mai et al.; A Survey of Concept-based Information Retrieval Tools on the Web; 2001 Proceedings of the 5th East-European Conference; 11 pages. (Year: 2001).*
Ghebreab, Sennay et al.; Concept-based retrieval of biomedical images; 2003 SPIE; Proceedings of SPIE; pp. 97-108. (Year: 2003).*
Snoek, Cees G. M. et al.; Concept-Based Video Retrieval; Foundations and Trends (R) in Information Retrieval, vol. 2, No. 4 (2008); pp. 215-322 (Year: 2008).*
Dietterich, Thomas G.; Ensemble Methods in Machine Learning; Springer-Verlag Berlin Heidelberg 2000; MCS 2000, LNCS 1857, pp. 1-15. (Year: 2000).*
Breen, Casey et al.; Image Classification Using Neural Networks and Ontologies; 2002 IEEE; Proceedings of the 13th International Workshop on Database and Expert Systems Applications (DEXA'02); 5 pages. (Year: 2002).*
Hansen, Lars Kai et al.; Neural Network Ensembles; 1990 IEEE; Transactions on Pattern Analysis and Machine Intelligence, vol. 12, No. 10; pp. 993-1001. (Year: 1990).*
Alzu'bi, Ahmand et al.; Semantic content-based image retrieval: A comprehensive study; 2015 Elsevier; J. Vis. Commun. Image R. 32 (2015) 20-54. (Year: 2015).*

\* cited by examiner

SYSTEMS AND METHODS FOR LEARNING NEW TRAINED CONCEPTS USED TO RETRIEVE CONTENT RELEVANT TO THE CONCEPTS LEARNED

FIELD OF THE DISCLOSURE

The present invention relates to systems and methods for learning new trained concepts used to retrieve content relevant to the concepts learned.

BACKGROUND

Digital media is frequently created by users in the forms of photos, videos, written text, and/or other forms of digital media. This information or content is generally stored, shared, accessed, and/or analyzed by systems throughout the world. Users rely on these systems to search large quantities of information, explore the information, and share it.

Information used to expose this information is typically either provided by other users or created by automated systems generally using a fixed set of recognizable patterns. An example of these patterns may be a dog in a picture, the genre of music in a song, or the sentiment of a snippet of text. However, even with sophisticated systems able to recognize patterns, these systems may fail to meet the expectations of users who have specific criteria in mind for retrieving the content they desire.

SUMMARY

Exemplary implementations of the disclosure may overcome the shortcomings of existing systems by facilitating the learning of new classification systems for discriminating information and content of interest from other content contained in a storage system or data stream.

One or more aspects of the disclosure relate to a system configured for learning new trained concepts used to retrieve content relevant to the concepts learned. The system may comprise one or more hardware processors configured by machine-readable instructions to obtain one or more digital media items; obtain an indication conveying a concept to be learned from the one or more digital media items; receive feedback associated with individual ones of the one or more digital media items. The feedback may be based on selection of one or more positive examples of the concept to be learned from the one or more digital media items, selection of one or more negative examples of the concept to be learned from the one or more digital media items, and/or a combination thereof. A given positive example may be a digital media item, comprising the concept to be learned. A given negative example may be a digital media item, lacking the concept to be learned. The one or more hardware processors are further configured by machine-readable instructions to obtain individual representations for the individual ones of the one or more digital media items. The individual representations may include one or more of machine learning representations, training systems representations, neural network representations, and/or other computing platform representations for the individual ones of the one or more digital media items. In some implementations, the one or more hardware processors may be further configured by machine-readable instructions to determine a trained concept based on the feedback, the individual representations of the one or more digital media items, and/or a combination thereof. The trained concept may be usable for retrieving digital media items relevant to the concept to be learned.

One or more aspects of the disclosure relate to a method for learning new trained concepts used to retrieve content relevant to the concepts learned with a system comprising one or more hardware processors. The method may include obtaining, one or more digital media items; obtaining an indication conveying a concept to be learned from the one or more digital media items; and receiving feedback associated with individual ones of the one or more digital media items. The feedback may be based on selection of one or more positive examples of the concept to be learned from the one or more digital media items, selection of one or more negative examples of the concept to be learned from the one or more digital media items, and/or a combination thereof. In some implementations, a given positive example may include one or more of a digital media item comprising the concept to be learned, a digital media item related to the concept to be learned, a digital media item similar to the concept to be learned, a digital media item similar to other digital media items comprising the concept to be known, and/or other positive examples of the concept to be learned. Negative examples may include digital media items not comprising, not related, and/or not relevant to the concept to be learned. In some implementations, digital media items may be clustered by similarity. The clusters of digital media items may be labeled as positive examples or negative examples. In some implementations, the method may further include obtaining individual neural network representations for the individual ones of the one or more digital media items. A given neural network representation may include one or more neural network layers. The method may further include determining a trained concept based on the feedback and the neural network representations of the one or more digital media items. The trained concept may be usable for retrieving digital media items relevant to the concept to be learned.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents, unless the context clearly dictates otherwise.

DETAILED DESCRIPTION

Figure 1:
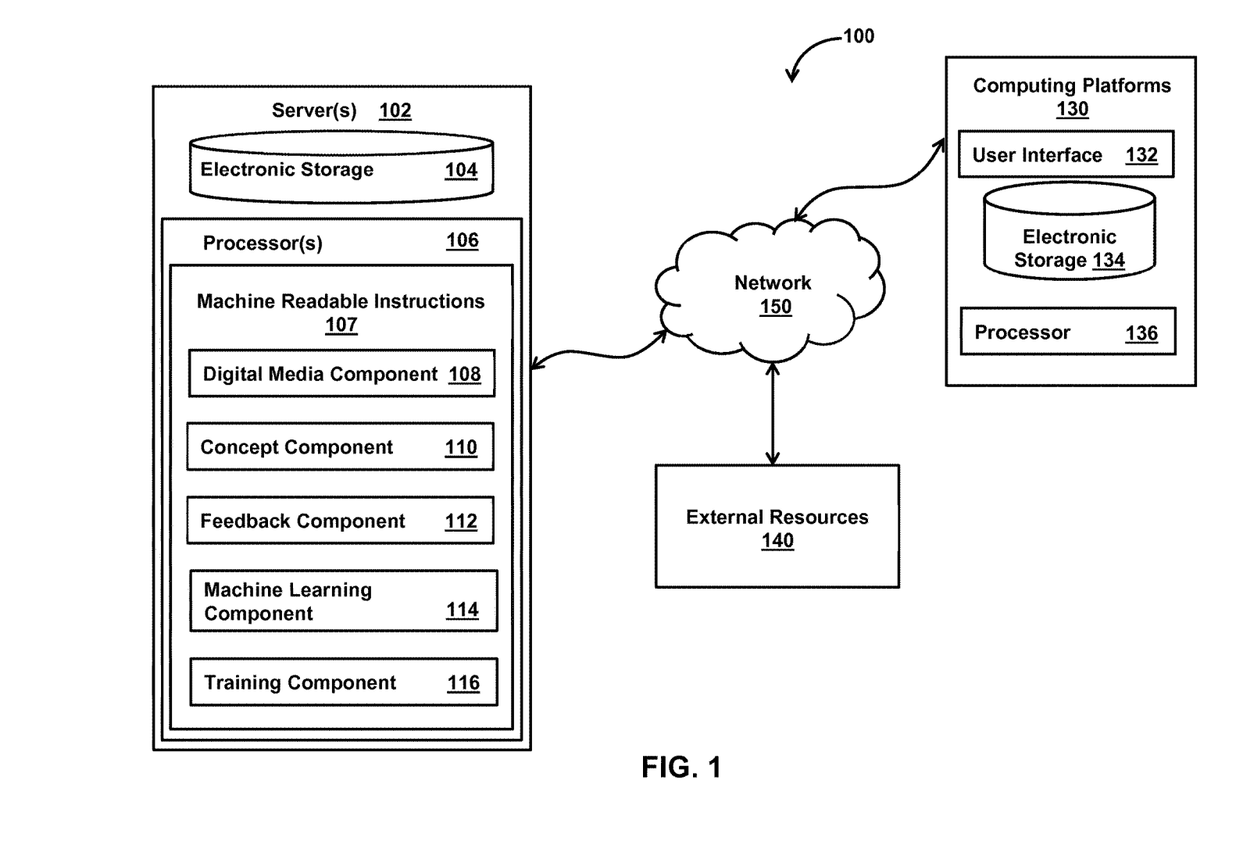
FIG. 1 illustrates a system configured for learning new trained concepts used to retrieve content relevant to the concepts learned, in accordance with one or more implementations.

FIG. 1 illustrates a system 100 configured for learning new trained concepts used to retrieve content relevant to the concepts learned, in accordance with one or more implementations. In some implementations, as shown in this example, system 100 may include one or more of servers 102, one or more computing platforms 130, one or more external resources 140, and/or other components.

Server(s) 102 may include electronic storage 104, one or more processors 106, and/or other components. Processor(s) 106 may be configured by machine-readable instructions 107. The machine-readable instructions 107 may include one or more of a digital media component 108, a concept component 110, a feedback component 112, a machine learning component 114, a training component 116, and/or other components.

Digital media component 108 may be configured to obtain one or more digital media items. Digital media items may be any type of content that exists in the form of digital information. For example, a given digital media item may include an image, a video, text, audio, a symbol, a sequence, web content, and/or any type of digital information. In some implementations, digital media component 108 may be configured to obtain information associated with individual ones of the digital media items. In some implementations, information associated with individual ones of the digital media items may comprise information stored as metadata associated with the digital media items. In some implementations, metadata may include one or more of timestamps, physical location where the media item was generated, user-generated information, source-generated information, and/or other information. In some implementations, metadata may be referred to as description, caption, label, tags, price, user reviews, likes, comments, followers, shares, and/or any other metadata. In some implementations, digital media items may be stored on digital and/or analog storage, may be digitally broadcast, streamed, and/or contained in computer files. In some implementations, digital media items may be obtained from electronic storage 104, electronic storage 134, computing platforms 130, other components of system 100, and/or other components outside of system 100.

In some implementations, digital media items may be obtained from computing platforms 130. In some implementations, computing platforms 130 may be associated with one or more of a human user, an automated machine, and/or other source. By way of non-limiting example, a user may provide a digital media item by "uploading" the digital media item, "downloading" the digital media item, and/or other ways for providing a digital media item to digital media item component 108 from computing platforms 130. In some implementations, a user providing one or more digital media items using a user interface 132. In some implementations, computing platforms 130 may include one or more digital media input devices included with, or coupled to, computing platforms 130. By way of non-limiting example, a media input device may include one or more of a document scanner, a camera, a microphone, a port configured to be communicatively coupled to a mobile device, and/or other considerations. In some implementations, electronic storage 104 and/or electronic storage 134 may receive a query from a user via computer platforms 130 to provide digital media items to digital media item component 108.

Figure 2:
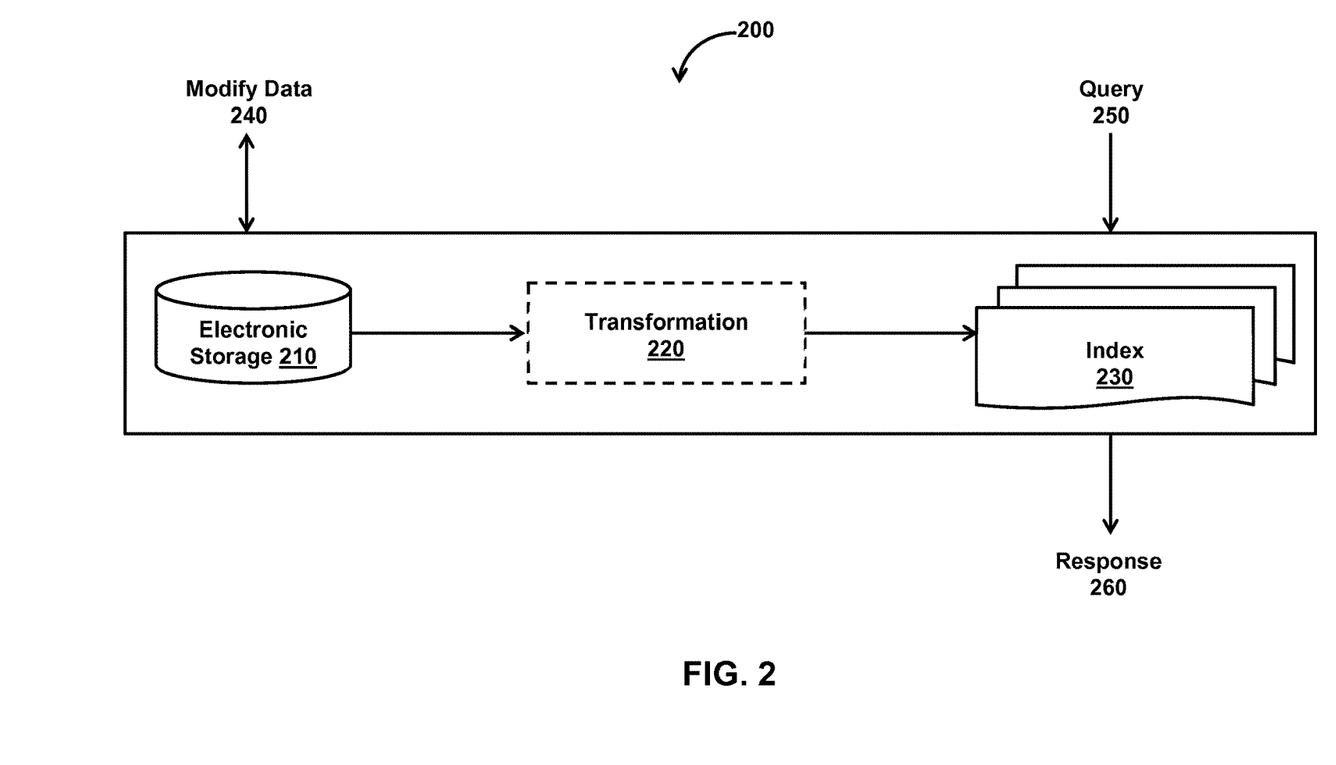
FIG. 2 illustrates an electronic storage system, in accordance with one or more implementations.

FIG. 2 illustrates an example of a storage system 200, in accordance with one or more implementations. Storage system 200 may be configured for facilitating the storage of digital media items. Storage system 200 may be configured for supporting queries. In some implementations, system 200 may be configured for supporting queries based on information associated with the digital media items. In the example illustrated in FIG. 2, digital media items may be stored in electronic storage 210. In some implementations, digital media items may be stored on remote devices and electronic storage 210 may contain references to the actual location of the digital media items (e.g., file points, urls, and/or other forms of referencing digital media).

In some implementations, information included in storage system 200 may be modified by modification 240. Modification 240 may include one or more of addition of new digital media items, removal of digital media items, modification of information associated with the digital media items stored in electronic storage 210, and/or other modification of content included within storage system 200 or outside of system 200. For example, in some implementations, modification 240 may include modification of digital media items stored on remote storage devices and referenced by electronic storage 210.

In some implementations, system 200 may include an index 230 for facilitating efficient queries and retrieval of items within electronic storage 210. The index 230 may be configured to facilitate matching digital media items with corresponding information. In some implementations, index 230 may facilitate direct lookup of content within electronic storage 210 in an efficient way. By way of non-limiting example, indexing may be made efficient by improving one or more of memory usage, time to index, time to query, and/or any other metrics improvements. A query 250 to retrieve digital media items may be made to storage system 200. A response 260 may be returned.

In some implementations, a query 250 may consist of a request for retrieval of information from storage system 200. In some implementations, a query 250 may be a request to retrieve one or more digital media items matching corresponding information in the request. In some implementations, a query 250 may be made by a user via computing platforms 130 (FIG. 1) and/or other components within or outside system 100 (FIG. 1). In some implementations, query 250 may be made by one or more components within or outside of system 100 (FIG. 1). In some implementations, query 250 may include additional operations on the one or more digital items retrieved as a response to query 250. Additional actions may include updating, inserting, deleting, and/or other actions on the one or more digital media items and/or actions on the information associated with the one or more digital media items retrieved as a response to query 250.

In some implementations, a transformation 220 may be applied to the digital media items to create a representation of the digital media items, such representation may facilitate the efficiency indexing with index 230. For example, in some implementations, transformation 220 may be configured to process a digital media item, with a machine learning system to extract a representation, of the digital media item, including relevant information for efficiently indexing the digital media item in index 230.

In some implementations, a response 260 may be retrieved responsive to a query 250. Response 260 may convey the information requested by query 250. In some implementations, response 260 may include one or more digital media items requested by query 250. Response 260 may be retrieved by way of comparison between representations of digital media items in index 230 with a representation included in query 250. For example, a representation of digital media items may be provided in query 250, as an embedding into a representation space such that comparing embedding of all digital media items in the index 230 can yield a similarity score between the query and the indexed items. Query 250 may ask for the most similar items according to the similarity score, the most dissimilar, and/or any other combination of items to retrieve in response 260. In some implementations, digital media items representation may be produced from one or more of a neural network, other machine learning systems, and/or other computing platforms.

Returning to FIG. 1, concept component 110 may be configured to obtain an indication conveying a concept to be learned from the one or more digital media items. A concept may refer to one or more of information, an idea, a notion, and/or any understanding that can be learned from one or more digital media items. In some implementations, a concept may refer to a sentiment, an adjective, a verb, a noun, an abstract notion, a concrete notion, and/or any other information that can be learned. For example, the concept of a "dog" may be learned from one or more photos that may contain a dog in them, from one or more sounds of dogs, from one or more descriptions of dogs, and/or from other information related to dogs. By way of non-limiting example, the concept "happy" may be learned from one or more images depicting happy people, from one or more sounds, from one or more audios of laughter, from one or more audios of music, from one or more audios of songs, from one or more texts, and/or other information related to "happy". An indication, conveying the concept to be learned, may be in the form of one or more of text, sound, voice, picture, and/or other forms for conveying the concept to be learned. The indication, conveying the concept to be learned, may be obtained from computing platform(s) 130, a user, and/or other components within or outside system 100.

Feedback component 112 may be configured to receive feedback associated with individual ones of the one or more digital media items. Feedback received by feedback component 112 may be received from one or more components within or outside of system 100. In some implementations, the feedback may be received from computing platforms 130. Computing platforms 130 may be configured to provide feedback associated with individual ones of the one or more digital media items to feedback component 112 based on a user input. In some implementations, receiving feedback for individual ones of the digital media items may include obtaining confirmation of information associated with the individual ones of the digital media items. In some implementations receiving feedback for individual ones of the digital media items may include obtaining confirmation of previous predictions related to the concept to be learned.

In some implementations, feedback provided to feedback component 112 may be based on selection of one or more positive examples of the concept to be learned from the one or more digital media items, such that a given positive example may be a digital media item related to the concept to be learned. The selection may be obtained from a user via user interface 132 and/or one or more components within or outside system 100. In some implementations, feedback provided to feedback component 112 may be based on selection of one or more negative examples of the concept to be learned from the one or more digital media items such that a given negative example may be a digital media item not related to the concept to be learned. By way of non-limiting example, positive examples of the concept of a "Labrador Retriever" may include images of a Labrador retriever. Negative examples of the concept of a "Labrador Retriever" may include images of cars, trees, mountains, Rottweilers, Poodles, and/or other images, which do not include a Labrador retriever. In some implementations, feedback provided to feedback component 112 may be based on selection of one or more positive examples and one or more negative examples of the concept to be learned.

Machine learning component 114 may be configured to obtain individual machine learning representations for the individual ones of the one or more digital media items. In some implementations, the machine learning representations may be neural network representations for the individual ones of the one or more digital media items. A neural network is typically organized in layers made up of a number of interconnected 'nodes' which contain an 'activation' function. Digital media items may be presented to the network via an 'input layer', which communicates to one or more 'hidden layers' where the actual processing is done via a system of weighted 'connections'. The hidden layers then link to an 'output layer' where a prediction is output. A given neural network representation may include one or more neural network layers. By way of non-limiting example, a convolutional neural network may be used for processing images. A convolutional neural network may be comprised of one or more convolutional neural network layers to learn weights shared over an image, one of more pooling layers to make the neural network more invariant, one or more non-linear activation function layers to make the network more robust and/or other type of neural network layers while taking in the image as input and outputting a vector representation, encoding high level information extracted from the image. By way of non-limiting example, for text, audio, and/or time series processing a recurrent neural network may be used to encode time series information as a vector output using weighted connections through time to process the time sequence of inputs Training component 116 may be configured to determine one or more trained concepts. The trained concept may be used for retrieving digital media items relevant to the concept to be learned. In some implementations, training component 116 may be configured to determine a trained concept based on one or more of the feedback associated with one or more digital media items, the one or more digital media items, and/or the individual representations of the one or more digital media items. In some implementations, training component 116 may be configured to determine additional neural network layers based on the feedback associated with one or more digital media items, and/or the neural network representations of the one or more digital media items.

Figure 3:
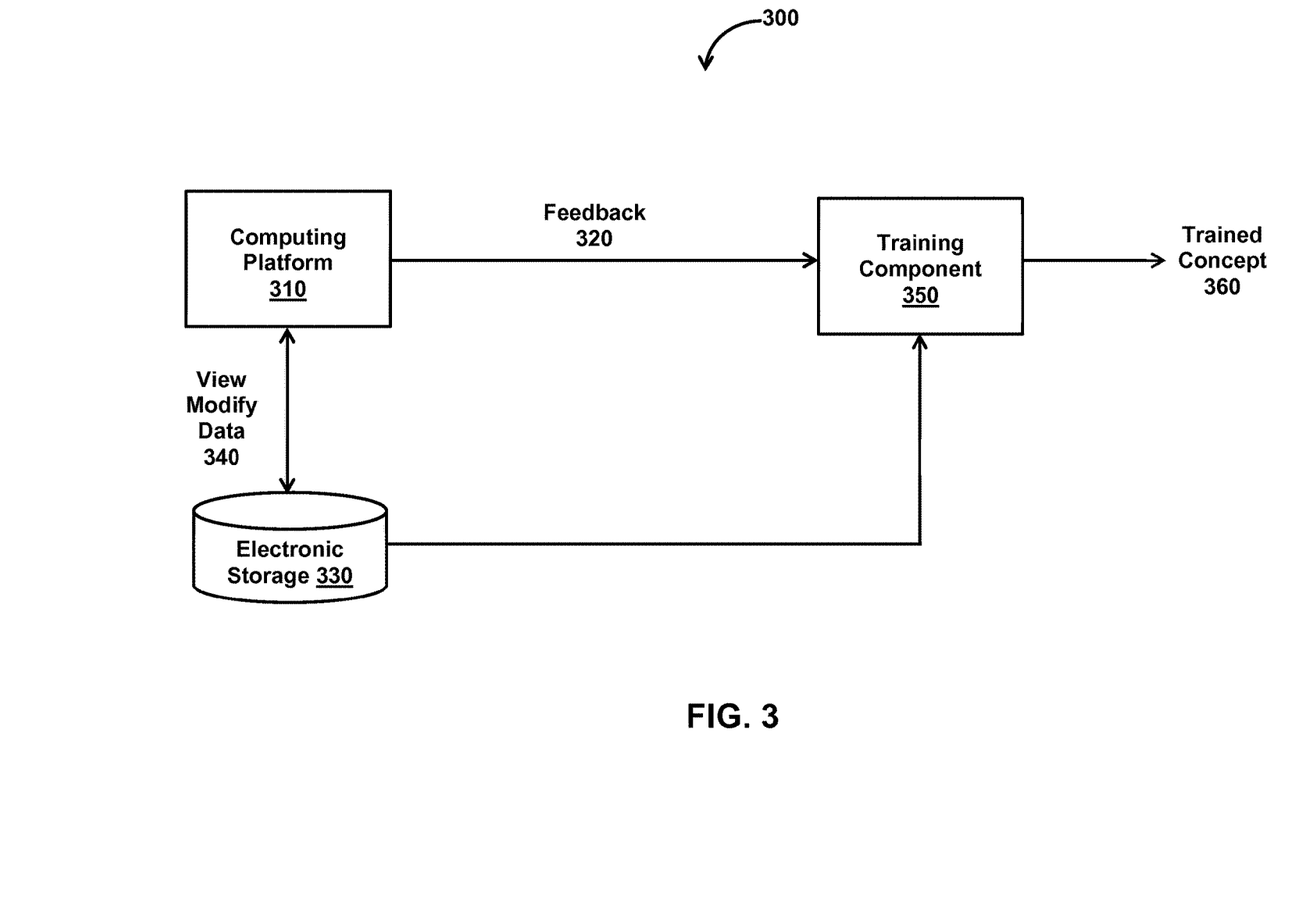
FIG. 3 illustrates a system configured for learning new concepts based on information and feedback from a computing platform, in accordance with one or more implementations.

FIG. 3 illustrates a system 300 configured for learning new concepts based on information and feedback from a computing platform 310, in accordance with one or more implementations. Digital media items, included in electronic storage system 330, may be modified by modification 340. Modification 340 may include one or more of addition of new digital media items, removal of digital media items, modification of information associated with the digital media items stored in electronic storage 330, and/or other modification to content stored in storage system 330. Digital media items may be retrieved from storage system 330 and presented to computing platform 310. In some implementations, computing platform 310 may include a user interface.

Feedback 320 associated with one or more digital media items may be received from computing platform 310. In some implementations, feedback 320 may be conveyed in the form of selection of digital media items, selection of labels, selection of text, association of digital media items with information relevant to the concept to learned, and/or other forms of feedback. For example, a concept to be learned is "dog". Feedback 320 associated with a set of images may be in the form of a set of selected images showing a dog, a set of selected images not showing a dog. In some implementations, feedback 320 may include confirmation of previous predictions by system 300, labeling digital media items as belonging to positive examples of the concept to be learned, labeling digital media items as belonging to negative examples of the concept to be learned, and/or other information relevant to the concept to be learned. In some implementations, feedback 320 may be based on user interactions with system 300. Examples of interactions with system 300 may include one or more of search history, search click through rate, liking content, sharing content, commenting on content, subscribing to content, and/or other interactions with system 300.

In some implementations, training component 350 may be configured to retrieve digital media items from electronic storage 330, for which feedback 320 is provided. In some implementations, digital media items may be retrieved from electronic storage 330 using a query. In some implementations, training component 350 may include a machine learning system, a computing platform, and/or a human operator(s). Training component 350 may be configured to learn from feedback 320 and digital media items retrieved from electronic storage 330. For example, training component 350 may improve predictions of the machine learning system based on the feedback 320 associated with the digital media items.

Training component 350 may be configured to determine a trained concept 360. In some implementations, trained concept 360 may represent the parameters of a machine learning method used by the training component 350 to learn from feedback 320. By way of non-limiting example, digital media items in electronic storage 330 may be a set of images, and feedback 320 may be labels of images containing birds and labels of images not containing birds. The training component 350 may learn from the labels provided by feedback 320. The labels provided by feedback 320 may be the parameters defining a bird classifier determined by the training component 350.

Returning to FIG. 1, electronic storage 104 may receive queries for digital media items related to the concept being learned. The trained concept obtained by training component 116 may be used to obtain results of the queries. In some implementations, additional feedback associated with the results of the queries may be received by training component 116. The feedback may be based on selection of one or more positive examples of the concept being learned from results of the queries, and/or selection of one or more negative examples of the concept being learned from the results of the queries. In some implementations, the trained concept may be adjusted based on the additional feedback. In some implementations, machine learning component 114 may be configured to obtain neural network representations of the results of the queries. The trained concept may be adjusted based on the additional feedback and/or the neural network representation of the results of the queries. By way of non-limiting example, for a trained concept of a "dog", additional feedback may include more positive examples of "dogs" (true positives) retrieved by querying for similar items to the trained concept, negative examples that were not "dogs" (false positives) when querying for similar items to the trained concept, negative examples that are not "dogs" (true negatives) when querying for dissimilar items to the trained concept, and/or positive examples of "dogs" (false negatives) when querying for dissimilar items to the trained concept.

Figure 4:
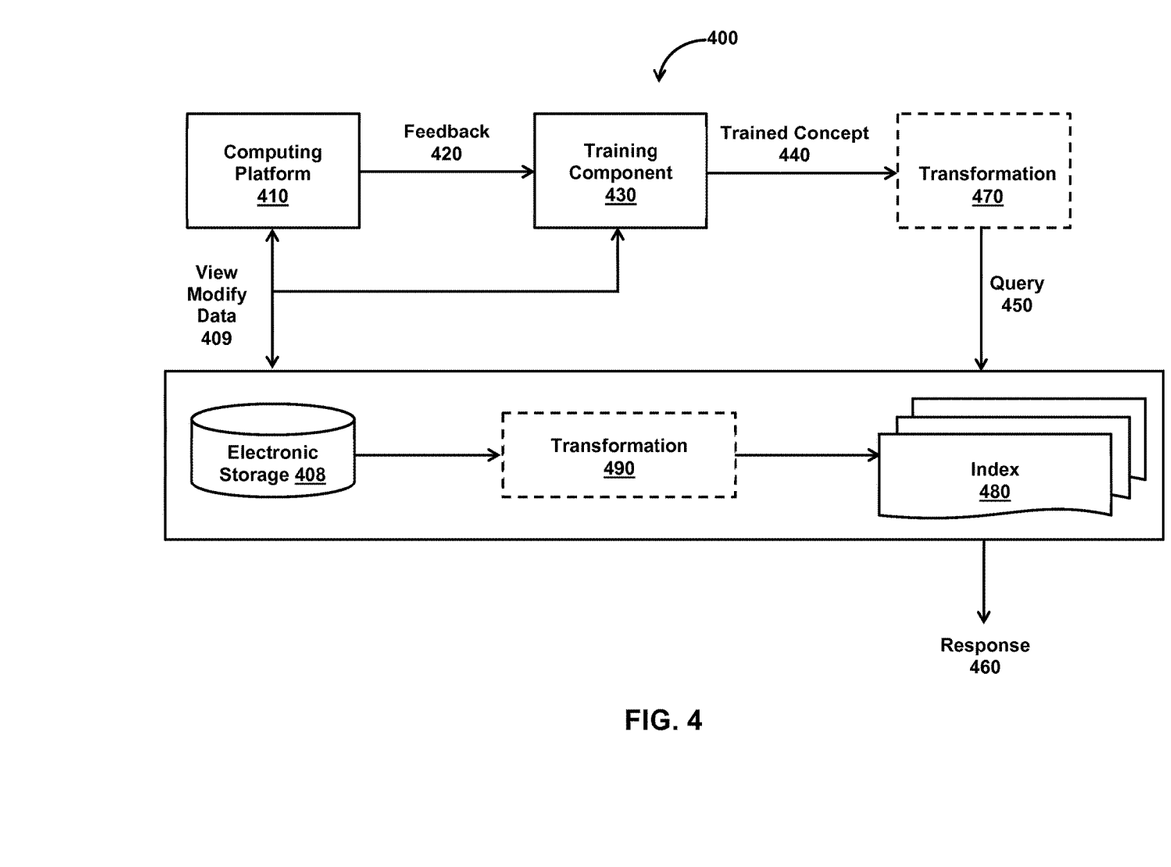
FIG. 4 illustrates a system configured for learning new trained concepts, in accordance with one or more implementations

FIG. 4 illustrates a system configured for learning new trained concepts, in accordance with one or more implementations. In some implementations, digital media items may be obtained by computing platform 410. Feedback 420 associated with individual ones of the digital media items may be generated. Feedback 420 and digital media items associated with feedback 420 may be provided to training component 430. Training component 430 may be configured to learn from feedback 420 and digital media associated with feedback 420. A trained concept 440 may be determined by training component 430. In some implementations, trained concept 440 may be transformed using a transformation 470. The transformation 470 may provide adjustments to the trained concept 440 to make it suitable in a query 450 on electronic storage 408. A query 450 may be used to retrieve more relevant digital media items to the concept to be learned. The results of query 450 may be returned in a response 460. The iterative procedure shown in FIG. 4 may be used to refine the trained concept 440 by presenting digital media items that were retrieved using the previously trained concept 440 to the computing platform 410 for additional feedback generation.

By way of non-limiting example, "dog" is the concept to be learned by training component 430. One or more images may be retrieved from electronic storage 408. Images representing a "dog" are provided as positive feedback 420 and images not representing a "dog" are provided as negative feedback 420. The training component 430 may leverage a machine learning framework configured to learn from the feedback 420. An example machine learning framework may be a simple one-layer neural network where the trained concept 440 may be the parameters W and b of the neural network representing the "dog" concept. W is the weight and b is the bias of the neural network representation of the trained concept 440. Electronic storage 408 may maintain a neural network representation for individual ones of the images stored in electronic storage 408. The training component 430 may be provided with the neural network representation for the images for which feedback 420 has been generated. Neural network representations of the images and the feedback 420 may be used by training component 430 to learn additional neural network layers to output as a trained concept 440. For example, the following operation may be used to learn one additional neural network layer as the trained concept 440:

$$\text{output}=f(W*x+b)$$

Where W is the learned weight vector of the trained concept 440, b is the bias of the trained concept 440, x is the neural network representation of the digital media item, and output is a confidence score of the trained concept 440 model with f( ) being an optional function applied to the output.

In some implementations, computing platform 410 may obtain more information to iterate the operations described above. The trained concept 440 may be transformed using transformation 470 to make it suitable to a query 450 on storage 408. A query 450 may be used to retrieve more relevant digital media items returned in a response 460. The weight W may be used in a query 450 by first applying a transformation 470 to W. A vector of weights unit length W' may be obtained by dividing the vector W by $W_{norm}$.

$$W'=W/W_{norm}$$

To efficiently leverage unit length W' of the trained concept 440, a transformation 490 may be applied on individual neural network representations in electronic storage 408. A transformation 490 may provide a unit length normalization x' of the neural network representation for individual digital media items to index 480:

$$x'=x/x_{norm}$$

With transformation 490 applied, the index 480 may retrieve digital media items, based on a query 450, by retrieving the nearest Euclidean distance D between the query W' and vectors x' in the index 480. Instead of computing the distance of W to every digital media item x in the electronic storage 408, an efficient nearest neighbor algorithm can be applied to significantly speed up the computations.

In some implementations, the original W*x+b product of the neural network applied to individual digital media items in electronic storage 408 may be retrieved. The product W*x+b may be retrieved to accurately order individual digital media items when presenting to computing platform 410. The following rescaling may be applied: assuming the index 480 returns the distance D of individual digital media items retrieved relative to the normalized weight W'. The W*x+b computation may be efficiently computed by using the following scalar computation:

$$W*x+b=-(D**2-2)*W_{norm}/(2*x_{norm})+b$$

After computing the W*x+b value, the order may be slightly different from the order returned using Euclidean distance D returned by index 480. An additional sort may be applied on the W*x+b results if order is important in the returned digital media items. Since the order of D distances is not identical to the W*x+b outputs, a typical pattern may be to query 450 the index 480 to retrieve a larger number of results than desired, compute the W*x+b values for those returned digital media items using the efficient equation above, and sort them to obtain the number of digital media items in a sorted order.

Returning to FIG. 1, processor(s) 106 and/or processor 136 may be configured to provide information processing capabilities in system 100 (e.g., in server(s) 102 and/or computing platforms 130). As such, processor(s) 106 and/or processor 136 may include one or more of a digital processor, an analog processor, a digital circuit designed to process information, an analog circuit designed to process information, a state machine, and/or other mechanisms for electronically processing information. Although processor(s) 106 and/or processor 136 are shown in FIG. 1 as a single entity, this is for illustrative purposes only. In some implementations, processor(s) 106 and/or processor 136 may include a plurality of processing units. These processing units may be physically located within the same apparatus (e.g., in server(s) 102 and/or computing platforms 130), or processor(s) 106 and/or 136 may represent processing functionality of a plurality of apparatuses operating in coordination (e.g., in server(s) 102 and/or computing platforms 130).

Electronic storage 104, electronic storage 134, and/or electronic storage 210 (FIG. 2) may comprise electronic storage media that electronically stores information. The electronic storage media of electronic storage 104, electronic storage 134, and or electronic storage 210 (FIG. 2) may include one or both of system storage that is provided integrally (i.e., substantially non-removable) with server(s) 102 and/or computing platforms 130, and/or may contain removable storage that is removably connectable to server(s) 102 and/or computing platforms 130 via, for example, a port or a drive. A port may include a USB port, a firewire port, and/or other port. A drive may include a disk drive and/or other drive. Electronic storage 104, electronic storage 134, and/or electronic storage 210 (FIG. 2) may include one or more of optically-readable storage media (e.g., optical disks, etc.), magnetically-readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically-readable storage media. The electronic storage 210 may include one or more virtual storage resources (e.g., cloud storage, a virtual private network, and/or other virtual storage resources). Electronic storage 104, electronic storage 134, and/or electronic storage 210 (FIG. 2) may store digital media items, software algorithms, information determined by processor(s) 106 and/or processor 136, information received from server(s) 102 and/or computing platforms 130, and/or other information that enables server(s) 102 and/or computing platforms 130 to function as described herein.

Computing platforms 130 may include user interface 132, electronic storage 134, one or more of a processor 136, and/or other components. User interface 132 may be configured to provide an interface between system 100 and a user through which the user may provide information to and receive information from system 100. This enables information, results and/or instructions, and any other communicable items, collectively referred to as "information", to be communicated between the user and one or more components of system 100. Examples of interface devices suitable for inclusion in user interface 132 include one or more of a keypad, buttons, switches, a keyboard, knobs, levers, a display screen, a touch screen, speakers, a microphone, an indicator light, an audible alarm, a printer, and/or other devices. In some implementations, user interface 132 may include a plurality of separate interfaces, including an interface that may be provided in server(s) 102, and a separate interface provided to view and/or manage stored information that has been retrieved from server(s) 102 (e.g., provided by a computer configured to receive information from server(s) 102 and other components of system 100).

The external resources 140 may include sources of information, hosts and/or providers of information outside of system 100, external entities participating with system 100, and/or other resources. In some implementations, some or all of the functionality attributed herein to external resources 140 may be provided by resources included in system 100 (e.g., in server(s) 102).

The network 150 may include the Internet and/or other networks, Intranets, near field communication, frequency (RF) link, Bluetooth®, Wi-Fi, and/or any type(s) of wired or wireless network(s). It will be appreciated that this is not intended to be limiting and that the scope of this disclosure includes implementations in which the server(s) 102, the computing platforms 130, and/or the external resources 140 are operatively linked via some other communication media.

It should be appreciated that, although components 108, 110, 112, 114, and/or 116 are illustrated in FIG. 1 as being co-located within a single component, in implementations in which processor(s) 106 may be configured by machine-readable instructions 107 to execute multiple components, one or more of components 108, 110, 112, and/or 114 may be located remotely from the other components. The description of the functionality provided by the different components 108, 110, 112, 114 and/or 116 described above is for illustrative purposes and is not intended to be limiting, as any of components 108, 110, 112, 114 and/or 116 may provide more or less functionality than is described. For example, one or more of components 108, 110, 112, 114, and/or 116 may be eliminated, and some or all of its functionality may be provided by other ones of components 108, 110, 112, 114,116, and/or other components. As another example, processor(s) 104 may be configured by machine-readable instructions 107 to execute one or more additional components that may perform some or all of the functionality attributed below to one of components 108, 110, 112, 114, and/or 116.

Figure 5:
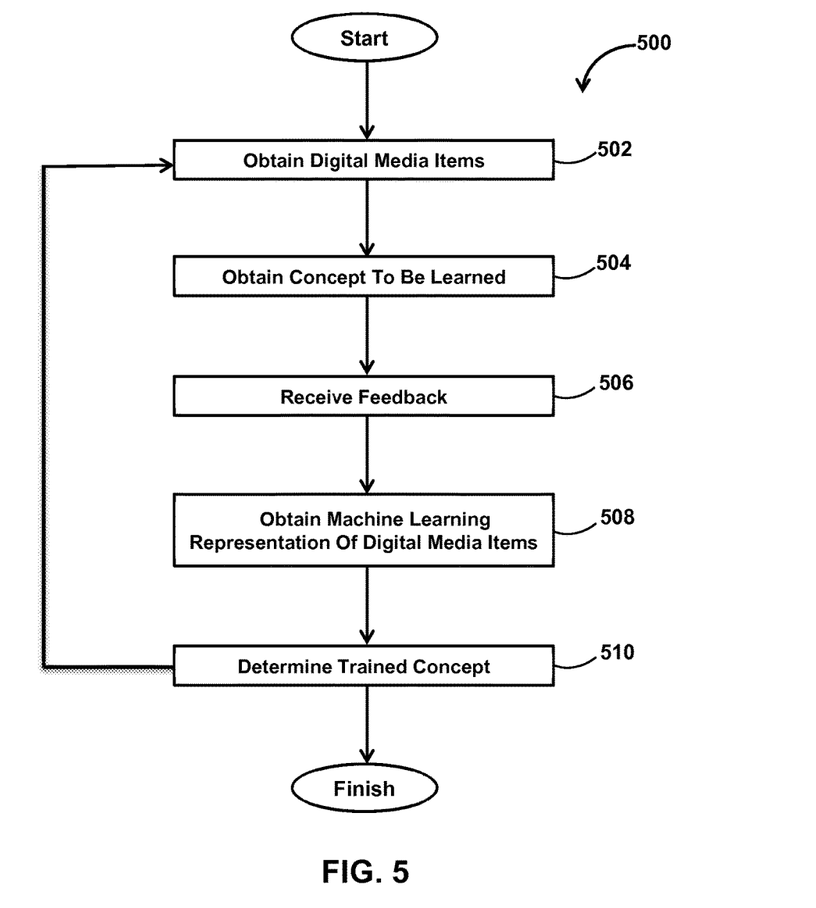
FIG. 5 illustrates a method for learning new trained concepts used to retrieve content relevant to the concepts learned, in accordance with one or more implementations.

FIG. 5 illustrates a method 500 for learning new trained concepts used to retrieve content relevant to the concepts learned. The operations of method 500 presented below are intended to be illustrative. In some embodiments, method 500 may be accomplished with one or more additional operations not described and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, a functionally-limited processing device, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, one or more digital media items may be obtained. In some implementations, operation 502 may be performed by a digital media component the same as or similar to digital media component 108 (shown in FIG. 1 and described herein).

At an operation 504, an indication conveying a concept to be learned from the one or more digital media items may be obtained. In some implementations, operation 504 may be performed by a concept component the same as or similar to the concept component 110 (shown in FIG. 1 and described herein).

At an operation 506, feedback associated with individual ones of the one or more digital media items may be received. The feedback may be based on of selection of one or more positive examples of the concept to be learned from the one or more digital media items, selection of one or more negative examples of the concept to be learned from the one or more digital media items, and/or a combination thereof. In some implementations, a given positive example may be a digital media item comprising the concept to be learned. In some implementations, a given negative example may be a digital media item lacking the concept to be learned. In some implementations, operation 506 may be performed by a feedback component the same as or similar to the feedback component 112 (shown in FIG. 1 and described herein).

At operation 508, individual machine learning representations for the individual ones of the one or more digital media items are obtained. In some implementations, individual neural network representations for the individual ones of the one or more digital media items are obtained. In some implementations, a given neural network representation may include one or more neural network layers. In some implementations, operation 508 may be performed by a machine learning component the same as or similar to the machine learning component 114 (shown in FIG. 1 and described herein).

At operation 510, a trained concept may be obtained. In some implementations, the trained concept may be based on the feedback, the individual machine learning representations of the one or more digital media items, and/or a combination thereof. In some implementations, operation 510 may be performed by a training component the same as or similar to the training component 116 (shown in FIG. 1 and described herein). In some implementations, the trained concept may be used for retrieving digital media items relevant to the concept to be learned. The retrieved digital media items may be used to reiterate operations 502-510 described above.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating retrieval of content relevant to a concept via a neural network representation of the concept, the system comprising:
a computer system comprising one or more processors programmed with computer program instructions that, when executed, cause the computer system to:
obtain media items including images, audios, or videos;
obtain an indication of a concept to be learned from the media items;
obtain, from one or more user devices, feedback regarding the media items, the feedback including a selection of at least one media item of the media items as a positive example of the concept and a selection of at least one media item of the media items as a negative example of the concept;
obtain, for each of the selected media items, a neural network representation of the selected media item, the neural network representation of the selected media item comprising a weight and bias for the selected media item;
determine a neural network representation of the concept based on (i) the neural network representations of the selected media items and (ii) the obtained feedback, the neural network representation of the concept comprising a weight and bias for the concept;
obtain a user request related to the concept subsequent to the determination of the neural network representation of the concept; and
generate a query based on the neural network representation of the concept to retrieve one or more media items related to the concept.

2. The system of claim 1, wherein the one or more processors cause the computer system to:
- multiply the neural network representations of the selected media items with a given weight of a first version of the neural network representation of the concept;
- add a given bias of the first version of the neural network representation of the concept to results of the multiplications, respectively; and
- adjust the first version of the neural network representation of the concept based on (i) results of the additions and (ii) the obtained feedback to determine a second version of the neural network representation of the concept,
- wherein generating the query comprises generating the query based on the second version of the neural network representation of the concept.

3. The system of claim 1, wherein the one or more processors cause the computer system to store, in a memory, the neural network representations of the selected media items.

4. The system of claim 1, wherein the one or more processors cause the computer system to:
- obtain additional media items related to the concept as results of the query;
- obtain, from one or more user devices, additional feedback regarding the additional media items, the additional feedback including a selection of at least one media item of the additional media items as a positive example of the concept and a selection of at least one media item of the additional media items as a negative example of the concept;
- obtain, for each of the selected additional media items, a neural network representation of the selected additional media item; and
- adjust the neural network representation of the concept based on (i) the neural network representations of the selected additional media items and (ii) the additional feedback.

5. The system of claim 1, wherein the concept includes a sentiment or a notion.

6. The system of claim 1, wherein the concept includes a person or an animal.

7. The system of claim 1, wherein the indication of the concept to be learned includes a description of the concept, a sound related to the concept, a voice of an individual, or an image depicting the concept.

8. The system of claim 1, wherein the indication of the concept to be learned includes at least two of a description of the concept, a sound related to the concept, a voice of an individual, or an image depicting the concept.

9. The system of claim 1, wherein the indication of the concept to be learned includes at least three of a description of the concept, a sound related to the concept, a voice of an individual, or an image depicting the concept.

10. A method of facilitating retrieval of content relevant to a concept via a neural network representation of the concept, the method comprising:
- obtaining, by one or more processors, media items including images, audios, or videos;
- obtaining, by the one or more processors, an indication of a concept to be learned from the media items;
- obtaining, by the one or more processors, from one or more user devices, feedback regarding the media items, the feedback including a selection of at least one media item of the media items as a positive example of the concept and a selection of at least one media item of the media items as a negative example of the concept;
- obtaining, by the one or more processors, for each of the selected media items, a neural network representation of the selected media item, the neural network representation of the selected media item comprising a weight and bias for the selected media item;
- determining, by the one or more processors, a neural network representation of the concept based on (i) the neural network representations of the selected media items and (ii) the obtained feedback, the neural network representation of the concept comprising a weight and bias for the concept;
- obtaining, by the one or more processors, a user request related to the concept subsequent to the determination of the neural network representation of the concept; and
- generating, by the one or more processors, a query based on the neural network representation of the concept to retrieve one or more media items related to the concept.

11. The method of claim 10, further comprising:
- multiplying, by the one or more processors, the neural network representations of the selected media items with a given weight of a first version of the neural network representation of the concept;
- adding, by the one or more processors, a given bias of the first version of the neural network representation of the concept to results of the multiplications, respectively; and adjusting, by the one or more processors, the first version of the neural network representation of the concept based on (i) results of the additions and (ii) the obtained feedback to determine a second version of the neural network representation of the concept,
- wherein generating the query comprises generating the query based on the second version of the neural network representation of the concept.

12. The method of claim 10, further comprising storing, by the one or more processors, in a memory, the neural network representations of the selected media items.

13. The method of claim 10, further comprising:
- obtaining, by the one or more processors, additional media items related to the concept as results of the query;
- obtaining, by the one or more processors, from one or more user devices, additional feedback regarding the additional media items, the additional feedback including a selection of at least one media item of the additional media items as a positive example of the concept and a selection of at least one media item of the additional media items as a negative example of the concept;
- obtaining, by the one or more processors, for each of the selected additional media items, a neural network representation of the selected additional media item; and
- adjusting, by the one or more processors, the neural network representation of the concept based on (i) the neural network representations of the selected additional media items and (ii) the additional feedback.

14. The method of claim 10, wherein the concept includes a sentiment or a notion.

15. The method of claim 10, wherein the concept includes a person or an animal.

16. The method of claim 10, wherein the indication of the concept to be learned includes a description of the concept, a sound related to the concept, a voice of an individual, or an image depicting the concept.

17. A system for facilitating retrieval of content relevant to a concept via a neural network representation of the concept, the system comprising:
- a computer system comprising one or more processors programmed with computer program instructions that, when executed, cause the computer system to:
  - obtain media items including images, audios, or videos;
  - obtain an indication of a concept to be learned from the media items;
  - obtain, from one or more user devices, feedback regarding the media items, the feedback including a selection of at least one media item of the media items as a negative example of the concept;
  - obtain, for each of the selected media items, a neural network representation of the selected media item, the neural network representation of the selected media item comprising a weight and bias for the selected media item;
  - determine a neural network representation of the concept based on (i) the neural network representations of the selected media items and (ii) the obtained feedback, the neural network representation of the concept comprising a weight and bias for the concept;
  - obtain a user request related to the concept subsequent to the determination of the neural network representation of the concept; and
  - generate a query based on the neural network representation of the concept to retrieve one or more media items related to the concept.

18. The system of claim 17, wherein the one or more processors cause the computer system to:
- multiply the neural network representations of the selected media items with a given weight of a first version of the neural network representation of the concept;
- add a given bias of the first version of the neural network representation of the concept to results of the multiplications, respectively; and
- adjust the first version of the neural network representation of the concept based on (i) results of the additions and (ii) the obtained feedback to determine a second version of the neural network representation of the concept,
- wherein generating the query comprises generating the query based on the second version of the neural network representation of the concept.

19. The system of claim 17, wherein the one or more processors cause the computer system to:
- obtain additional media items related to the concept as results of the query;
- obtain, from one or more user devices, additional feedback regarding the additional media items, the additional feedback including a selection of at least one media item of the additional media items as a positive example of the concept and a selection of at least one media item of the additional media items as a negative example of the concept;
- obtain, for each of the selected additional media items, a neural network representation of the selected additional media item; and
- adjust the neural network representation of the concept based on (i) the item neural network representations of the selected additional media items and (ii) the additional feedback.

20. The system of claim 17, wherein the concept includes a sentiment or a notion.

* * * * *